United States Patent [19]

Miura et al.

[11] Patent Number: 5,171,552
[45] Date of Patent: Dec. 15, 1992

[54] DRY PROCESSES FOR TREATING COMBUSTION EXHAUST GAS

[75] Inventors: Yoshimasa Miura; Etsuo Ogino; Michio Ito, all of Maizuru; Toshio Hama, Nishinomiya; Shigenori Onitsuka, Ikoma; Michio Ishida, Nara; Teruyuki Doi, Kawachinagano; Teruhiko Kawanabe, Kobe, all of Japan

[73] Assignee: Hitachi Zosen Corporation, Japan

[21] Appl. No.: 552,382

[22] Filed: Jul. 13, 1990

[30] Foreign Application Priority Data

Jul. 19, 1989 [JP] Japan .................................. 1-187652
Jul. 28, 1989 [JP] Japan .................................. 1-197375
Jul. 28, 1989 [JP] Japan .................................. 1-197376
Jul. 28, 1989 [JP] Japan .................................. 1-197379

[51] Int. Cl.$^5$ .................. C01B 17/48; C01B 21/20
[52] U.S. Cl. ................... 423/239; 110/345; 423/235; 423/240.5; 423/244.07
[58] Field of Search ............... 423/235, 239, 243, 244, 423/245.2; 110/345

[56] References Cited

U.S. PATENT DOCUMENTS

4,533,532 8/1985 Gebhard et al. .................... 423/243
4,731,233 3/1988 Thompson et al. ................. 423/243
4,980,138 12/1990 Samish ................................ 423/239

Primary Examiner—Wayne Langel

[57] ABSTRACT

The invention provides a furnace desulfurization process which includes supplying a desulfurizing agent into a furnace or flue to cause the agent to absorb $SO_2$ from the exhaust gas, the desulfurizing agent being a salt obtained by at least partly neutralizing a Ca desulfurizing agent with an acid; a furnace desulfurization process which includes supplying a Ca desulfurizing agent into a furnace or flue to effect a first-stage desulfurization reaction, collecting ash containing a waste of the agent having an unreacted substance enclosed therein from the exhaust gas, adding an acid to the collected ash to at least partly neutralize the unreacted portion of the agent, and recycling the ash containing the resulting salt into the furnace or flue to effect a second-stage desulfurization reaction; a dry simultaneous desulfurization-denitration process which includes supplying a Ca desulfurizing agent into a furnace or flue to effect a desulfurization reaction, collecting ash containing a waste of the agent having an unreacted substance enclosed therein from the exhaust gas, adding a denitrating reducing agent to the collected ash, and recycling the ash containing the waste desulfurizing agent and the reducing agent into the furnace or flue to effect desulfurization and denitration reactions; and a dry simultaneous desulfurization-denitration process which includes supplying a Ca desulfurizing agent into a furnace or flue to effect a desulfurization reaction, collecting ash containing a waste of the agent having an unreacted substance enclosed therein from the exhaust gas, adding an acid to the collected ash to at least partly neutralize the unreacted substance, adding a denitrating reducing agent to the ash containing the resulting salt, and recycling the ash containing the salt and the reducing agent into the furnace or flue to effect desulfurization and denitration reactions.

12 Claims, 7 Drawing Sheets

DRY PROCESSES FOR TREATING COMBUSTION EXHAUST GAS

FIELD OF THE INVENTION

The present invention relates to a dry process for treating combustion exhaust gases discharged from boilers, furnaces, refuse incinerators and the like for the control of air pollution, and more particularly to a process for removing acid gases, such as sulfur oxides (SOx) and hydrogen chloride (HCl), from combustion exhausts or flue gases, and to a process for removing such acid gases and nitrogen oxides (NOx) at the same time.

DESCRIPTION OF THE PRIOR ART

Processes still remain to be established for simultaneously removing SOx and NOx from combustion gases or flue gases, so that these oxides are removed by different processes individually. Typical of desulfurization processes is the lime-gypsum process wherein the exhaust gas is washed with a lime slurry to absorb SOx. This process has technically matured to completion and is practiced by many actual apparatus, whereas the process, which is of the wet type, requires water, and treatment of the effluent and white smoke. Accordingly, dry processes are desired which need not meet these requirements. Typical of the dry processes is the furnace desulfurization process wherein a Ca desulfurizing agent, such as $CaCO_3$ or $Ca(OH)_2$, is placed directly into the furnace of a pulverized coal firing boiler, refuse incinerator or the like to absorb and remove $SO_2$ and HCl produced in the furnace. This process is completely of the dry type, is therefore free of the above-mentioned problem of the wet process but has the most serious problem of being low in desulfurization efficiency. At present, this process has yet to be practiced.

On the other hand, predominantly employed for denitration is the selective catalytic reduction process which is practiced with use of ammonia as a reducing agent and a titanium-vanadium catalyst and which has proved useful in many cases. Another denitration process is known in which ammonia is introduced into a high-temperature region of at least 900° C. to non-catalytically remove NOx. This process employs ammonia, or depending on the conditions concerned, a compound which produces ammonia on thermal decomposition, such as ammonium carbonate, urea, ammonium formate or ammonium oxalate. However, the process requires a larger amount of such a reducing agent than the catalytic process and is as low as about 50% in denitration efficiency.

Accordingly, in the case where both SOx and NOx need to be removed at the same time, the lime-gypsum wet process and the selective catalytic reduction process with use of ammonia are employed in combination. The combined process has been practiced most widely and is excellent in that the process achieves a high desulfurization efficiency and a high denitration efficiency, whereas the process, which is essentially the combination of two processes, is not always satisfactory since the combined process is complex, effects desulfurization by the wet method and is high in both the initial cost and the running cost.

The low efficiency of the furnace desulfurization process is thought attributable to the following causes.

The furnace desulfurization process generally uses Ca desulfurizing agents, typical of which are $CaCO_3$ and $Ca(OH)_2$.

When the desulfurizing agent is charged into the high-temperature region of furnaces, the following reactions take place for the absorption of $SO_2$. Decomposition of $CaCO_3$ or $Ca(OH)_2$ in the high temperature region:

$$CaCO_3 \rightarrow CaO + CO_2 \uparrow \tag{1}$$

$$Ca(OH)_2 \rightarrow CaO + H_2O \uparrow \tag{2}$$

Absorption of $SO_2$ by desulfurizing agent in the high-temperature region:

$$CaO + SO_2 + \tfrac{1}{2}O_2 \rightarrow CaSO_4 \tag{3}$$

With the reaction of the formula (3), however, the $SO_2$ absorption reaction velocity greatly decreases with time owing to the causes (a) to (e) given below.

(a) With the absorption of $SO_2$, a $CaSO_4$ layer is formed over the surfaces of CaO particles, and the layer reduces the reaction velocity.

(b) With the absorption of $SO_2$, the $SO_2$ concentration around the surfaces of CaO particles lowers, thereby reducing the reaction velocity.

(c) The internal temperature of furnaces usually lowers downstream thereof, so that the reaction velocity lowers with the decrease in the temperature.

(d) Generally in the furnace desulfurization process, the desulfurizing agent in the form of a powder or slurry is uniformly charged into the furnace, dispersed and brought into contact with the exhaust gas. Since this contact is effected in a large space, the contact efficiency is low.

(e) Since the reaction between the desulfurizing agent and the gas is rate-determined by the surface area of particles of the agent, it is desired that the particle size of the desulfurizing agent be smaller to afford an increased surface area for the reaction, whereas it is technically difficult to uniformly disperse fine particles within the furnace.

Because of these causes, the conventional furnace desulfurization process is thought to be inevitably low in efficiency.

It is now assumed that the ratio of the amount of Ca (moles/hour) charged into the furnace to the amount of $SO_2$ gas (moles/hour) produced in the furnace is a Ca/S mole equivalent ratio (hereinafter referred to as the "Ca/S equivalent ratio"). For example, according to the data presently made public by EPA (Environmental Protection Agency, U.S.A.), the furnace desulfurization efficiency is about 60% at Ca/S=3. Such a low efficiency appears attributable to the above causes; highly efficient desulfurization will not be achieved unless these causes are obviated.

SUMMARY OF THE INVENTION

An object of the present invention is to provide a dry desulfurization process wherein a specific desulfurizing agent is used to thereby achieve a high desulfurization efficiency comparable to that of the wet process.

Another object of the invention is to provide a process for removing SOx and NOx at the same time at a low cost, each at a high efficiency.

The present invention provides a furnace desulfurization process comprising supplying a desulfurizing agent into a furnace or flue to cause the agent to absorb $SO_2$ in the exhaust gas, the desulfurizing agent being a salt obtained by at least partly neutralizing a Ca desulfurizing agent with an acid (hereinafter referred to as a "first process").

The present invention further provides a furnace desulfurization process comprising supplying a Ca desulfurizing agent into a furnace or flue to effect a first-stage desulfurization reaction, collecting ash containing a waste of the agent having an unreacted substance enclosed therein from the exhaust gas, adding an acid to the collected ash to at least partly neutralize the unreacted portion of the desulfurizing agent, and recycling the ash containing the resulting salt into the furnace or flue to effect a second-stage desulfurization reaction (hereinafter referred to as a "second process").

The present invention further provides a dry simultaneous desulfurization-denitration process comprising supplying a Ca desulfurizing agent into a furnace or flue to effect a desulfurization reaction, collecting ash containing a waste of the agent having an unreacted substance enclosed therein from the exhaust gas, adding a denitrating reducing agent to the collected ash, and recycling the ash containing the waste desulfurizing agent and the reducing agent into the furnace or flue to effect desulfurization and denitration reactions (hereinafter referred to as a "third process").

The present invention further provides a dry simultaneous desulfurization-denitration process comprising supplying a Ca desulfurizing agent into a furnace or flue to effect a desulfurization reaction, collecting ash containing a waste of the agent having an unreacted substance enclosed therein from the exhaust gas, adding an acid to the collected ash to at least partly neutralize the unreacted substance, adding a denitrating reducing agent to the ash containing the resulting salt, and recycling the ash containing the salt and the reducing agent into the furnace or flue to effect desulfurization and denitration reactions (hereinafter referred to as a "fourth process").

BRIEF DESCRIPTION OF THE DRAWINGS

FIGS. 5 (a), (b), (c) and (d) are each a diagram in section showing a particle of waste desulfurizing agent having an unreacted substance enclosed therein;

DESCRIPTION OF THE PREFERRED EMBODIMENTS

A) The furnace desulfurization process as the first process has been accomplished based on the following finding.

Generally in the case of the absorption reaction of the formula (3) given in "DESCRIPTION OF THE PRIOR ART," the smaller the particle size of the Ca desulfurizing agent used, the higher is the absorption efficiency. We tested $CaCO_3$ for desulfurization efficiency, with the results shown in FIG. 1. Curve A in the graph represents the result obtained with $CaCO_3$, 12 $\mu$ in mean particle size, and Curve B the result when the mean particle size was up to 3 $\mu$. The graph indicates that the smaller the particle size of the desulfurizing agent, the higher is the desulfurization efficiency. Borgwardt (Chemical Engineering Science, Vo.. 44, No. 1, 1988) reported that the specific surface area of CaO obtained by the thermal decomposition of $CaCO_3$ according to the reaction formula (1) was 104 $m^2/g$ when maximum, and that the specific surface area of CaO obtained from $Ca(OH)_2$ according to the reaction formula (2) was 76 $m^2/g$ when maximum. When we tested $CaCO_3$ and $Ca(OH)_2$ of the same particle size for desulfurization efficiency in the same manner as above, the former similarly achieved a higher efficiency. The reason appears to be as follows. The reaction between CaO and $SO_2$ is a solid-gas reaction, the velocity of which is determined by the specific surface area of CaO. $CaCO_3$ attains a higher desulfurization efficiency because the CaO resulting from the thermal decomposition of $CaCO_3$ has a larger specific surface area than the CaO resulting from that of $Ca(OH)_2$ as reported by Borgwardt.

We have carried out intensive research on how to give an increased specific surface area to the CaO resulting from the thermal decomposition of Ca desulfurizing agents based on this principle and accomplished the present invention.

Examples of acids for use in the first process of the invention are preferably organic acids, such as acetic acid, oxalic acid and formic acid, which are used singly or in combination.

It is also possible to use an organic acid salt of a desulfurizing metal as the desulfurizing agent in the form of a salt. The organic acid salt of desulfurizing metal to be used is preferably calcium acetate.

Preferably, the desulfurizing agent in the form of a salt is blown, in the form of a powder or slurry, into the furnace or flue in the region thereof having a temperature of 500 to 1200° C.

B) In exploring measures for eliminating the causes (a) to (e) mentioned in "DESCRIPTION OF THE PRIOR ART," we have found that the desulfurization efficient can be improved greatly especially by activating the waste desulfurizing agent resulting from use and having an unreacted portion of desulfurizing agent enclosed therein and recycling the agent thus treated. The furnace desulfurization process as the second process has been accomplished based on this finding.

Examples of preferred acids for use in the second process are inorganic acids, such as hydrochloric acid, nitric acid and hydrogen chloride, and organic acids, such as acetic acid, oxalic acid and formic acid. These acids are used singly or in combination. Also usable are halogen gases such as chlorine, bromine, fluorine and iodine.

With the second process, the amount of fresh desulfurizing agent to be supplied can be greatly reduced, whereas the process achieves a high desulfurization efficiency of at least 90% when the equivalent ratio of the Ca supply to S is 2.

Figure 6:
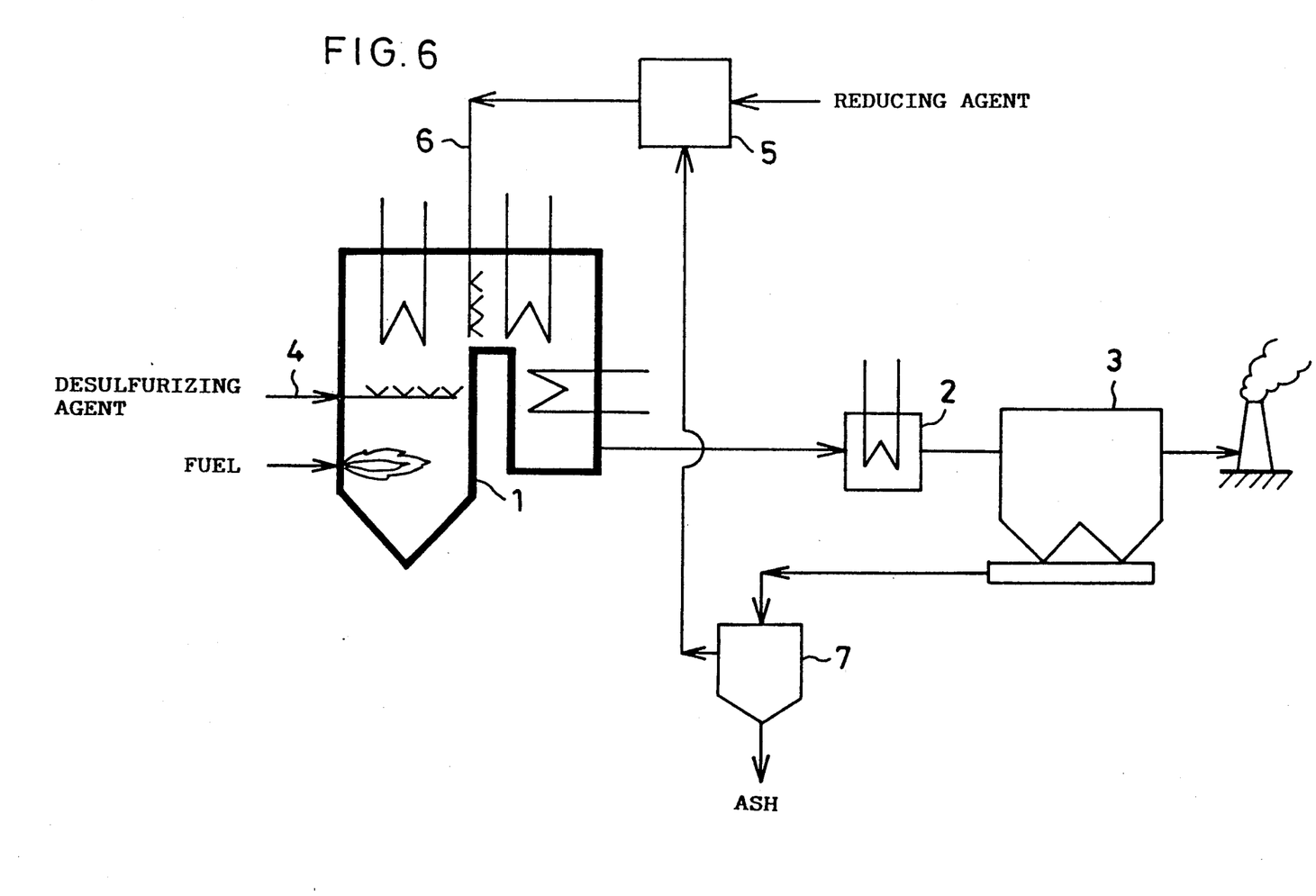
FIGS. 6 to 8 are flow charts showing processes of the invention.
Figure 7:
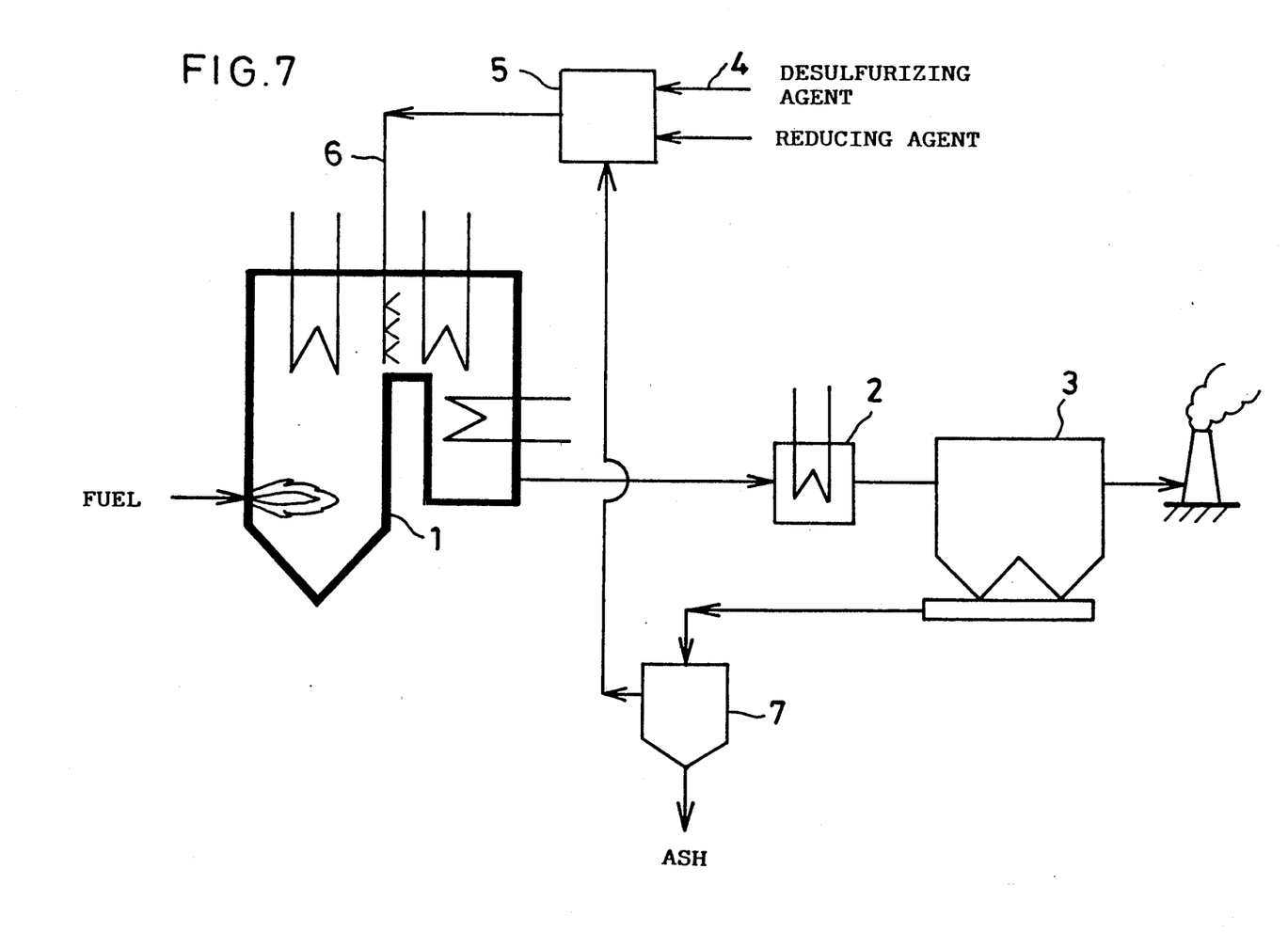

C) With the third process, the Ca desulfurizing agent may be supplied into the furnace or flue singly (see FIG. 6), or along with the ash containing the waste of the agent and the denitrating reducing agent (see FIG. 7).

Examples of desirable denitrating reducing agents are ammonia; ammonium salts such as ammonium carbonate, ammonium formate and ammonium oxalate; urea and urea derivatives, which are used singly or in combination in the form of a powder or solution.

The ash containing the waste desulfurizing agent and the reducing agent is blown, in the form of a powder or slurry, into the furnace or flue in the region thereof having a temperature preferably of 500 to 1000° C., more preferably 600 to 900° C. At temperatures higher than 1000° C., the process fails to remove NOx due to the formation of NOx. At temperatures lower than 500° C., both the desulfurization efficiency and denitration efficiency lower to levels which are not useful practically.

Preferably, the content of waste desulfurizing agent in the collected ash is increased by removing the ash by a pneumatic classifier or like ash separator.

The desulfurization-denitration process of the present invention achieves a desulfurization efficiency of at least 80% and a denitration efficiency of at least 60%. For example, when ash containing a waste desulfurizing agent and 20% of urea is blown into a region of about 800° C. in temperature at a Ca/S ratio of 3, the process achieves a desulfurization efficiency of about 90% and a denitration efficiency of about 70%.

If no reducing agent is added, neither of desulfurization and denitration reactions occurs in the temperature region of 500 to 1000° C. The fact that the addition of the reducing agent to the collected ash effects desulfurization and denitration in the low temperature region is an entirely novel finding. This fact is thought attributable to the activation of the surfaces of particles of the Ca desulfurizing agent by the reducing agent.

FIG. 6 is a flow chart showing a mode of practicing the third process of the invention. The illustrated system consists essentially of a boiler 1, an air heater 2 for cooling the exhaust gas produced in the boiler, a dust collector 3, such as an electric dust collector or bag filter, for removing dust from the exhaust gas, an injector 4 for injecting a Ca desulfurizing agent into the furnace of the boiler 1, an ash separator 7, such as a pneumatic classifier, for increasing the content of waste desulfurizing agent in the ash collected by the dust collector 3, a mixer 5 for mixing the collected ash with a denitrating reducing agent, and an injector 6 for injecting the ash containing the waste desulfurizing agent and the reducing agent into the flue. The Ca desulfurizing agent is supplied into the furnace of the boiler 1 by the injector 4 to effect a desulfurization reaction. The exhaust gas produced by the boiler 1 is cooled by the air heater 2, and the ash containing the waste desulfurizing agent having an unreacted substance enclosed therein is subsequently collected from the exhaust gas by the dust collector 3. The waste desulfurizing agent present in the collected ash is concentrated to a content of at least 30% by the ash separator 7, whereupon the reducing agent is admixed with the ash by the mixer 5. The resulting ash containing the waste desulfurizing agent and the reducing agent is recycled into the flue of the boiler 1 by the injector 6 to effect desulfurization and denitration reactions.

The content of the waste desulfurizing agent in the ash, the amount of reducing agent to be added to the ash and the ratio between the ash and the reducing agent are determined according to the contemplated desulfurization efficiency and denitration efficiency. When high desulfurization and denitration efficiencies are required, the ash containing the waste and the reducing agent is introduced into the flue invariably in an increased amount.

FIG. 7 is a flow chart showing another mode of practicing the third process of the invention. The illustrated system differs from the one shown in FIG. 6 in the position where fresh Ca desulfurizing agent is added. In the present mode, the desulfurizing agent is not injected singly into the furnace of the boiler 1 but is admixed with the ash containing the waste desulfurizing agent and the reducing agent within the mixer 5 and supplied to the flue along with the ash. Although the present process is basically the same as the foregoing process of FIG. 6, the system is simplified in corresponding relation to the absence of the injector for supplying the Ca desulfurizing agent into the furnace. However, since no desulfurization occurs within the furnace, the ash containing the waste desulfurizing agent and the reducing agent is added in an increased amount. For the discharged exhaust gas to have the same $SO_2$ concentration as in the case of the flow chart of FIG. 6 although no desulfurization occurs in the furnace, the ash containing the waste and the reducing agent needs to achieve a higher desulfurization efficiency and is therefore supplied in a larger amount. The two systems are exactly the same in respect of the removal of NOx, and there is no difference therebetween in the amount of waste- and reducing agent-containing ash in this respect.

The third process of the invention, which is completely of the dry type, effects desulfurization and denitration at the same time with an exceedingly greater ease than the conventional combination of the wet lime-gypsum process and the catalytic reduction process with use of ammonia. The desulfurization and denitration effected at the same time in a low-temperature region by using the collected ash containing the denitrating reducing agent are not only advantageous to the purification of exhaust gas but also of great economical advantage since the waste desulfurizing agent having an unreacted substance enclosed therein is effectively utilized. The waste desulfurizing agent in the ash contains a high proportion of $CaSO_4$, so that the present process is also advantageous from the viewpoint of ease of after treatment.

D) In the fourth process of the invention, the salt- and reducing agent-containing ash is blown, preferably in the form of a powder or slurry, into the furnace or flue in the region thereof having a temperature preferably of 500 to 1000° C., more preferably 600 to 900° C. At temperatures higher than 1000° C., the process fails to remove NOx since NOx is formed. At temperatures lower than 500° C., both the desulfurization efficiency and the denitration efficiency lower to levels which are not useful practically.

Examples of preferred denitrating reducing agents are ammonia; ammonium carbonate, ammonium formate, ammonium oxalate and like ammonium salts; urea and urea derivatives, which are used singly or in combination in the form of a powder or solution.

Examples of preferred acids are hydrochloric acid, nitric acid, hydrogen chloride and like inorganic acids, and acetic acid, oxalic acid, formic acid and like organic acids, which are used singly or in combination. Also usable are halogen gases such as chlorine, bromine, fluorine and iodine.

Preferably, the content of waste desulfurizing agent in the collected ash is increased by removing the ash by a pneumatic classifier or like ash separator.

The circumstances will be described below which have led us to complete the fourth process of the invention, i.e., simultaneous desulfurization-denitration process.

The desulfurization efficiency of the furnace direct desulfurization process can be improved by:
i) charging the desulfurizing agent into the furnace in the region thereof having an optimum temperature,
ii) ingeniously charging a powder of desulfurizing agent into the furnace to uniformly disperse the agent and thereby effectively contact the agent with the exhaust gas, and
iii) using particles of absorbing agent which are large in surface area, i.e., small in size since the $SO_2$ absorbing reaction by the desulfurizing agent is a solid-gas reaction which is governed by the surface area of particles thereof.

As already mentioned, EPA of U.S.A. recently reported that the desulfurization efficiency achieved at a Ca/S equivalent ratio of 3 is about 60%. According to the report, the ratio of effective utilization of the Ca desulfurizing agent is 20%, and the remaining 80% of Ca component is discharged and disposed of along with ash in the form of CaO or $CaCO_3$. Thus, the effective Ca utilization of the conventional furnace desulfurization process is generally much lower than the Ca utilization ratio of the wet process which is at least 95%, and must therefore be improved.

The effective utilization ratio can be improved by recycling into the furnace the waste of desulfurizing agent having enclosed therein an unreacted substance present in the ash to utilize the agent again for absorbing $SO_2$.

The most typical of such recycling systems is the recycling fluidized bed system. Literature says that this system achieves a desulfurization efficiency of 90% at Ca/S = 1.5. The Ca utilization ratio then achieved is about 60%, which is a remarkable improvement over the corresponding ratio of the conventional furnace desulfu-rization process. With the fluidized bed system, the recycling rate is said to be about 100 times the rate of discharge of ash to result in a considerably great power loss due to recycling.

Thus, the conventional furnace desulfurization process (a) fails to achieve a high desulfurization efficiency of at least 90% and therefore to meet the standard for discharging $SO_2$ in countries where stringent pollution control regulations are set, and (b) is extremely low in effective Ca utilization ratio, consequently discharging an increased amount of ash and entailing a higher cost for the chemical agent, and is therefore practiced on a smaller scale in this country than in the U.S. and European countries recently.

In order to overcome the foregoing problems of the furnace desulfurization process, we have made basic improvements in the methods i) to iii), practiced the recycling of the waste desulfurizing agent having an unreacted substance enclosed therein, and investigated how to activate the waste desulfurizing agent to improve the $SO_2$ absorbing ability of the waste, further conducting tests on simultaneous desulfurization-denitration processes along with these attempts.

Our efforts have revealed the following.
(1) The absorbing agent, when reduced in particle size, results in an improved desulurization efficiency. For example, $CaCO_3$, when up to 3 μ in particle size, achieves a desulfurization efficiency of 90% at Ca/S = 3.
(2) The waste defulfurizing agent enclosing the unreacted substance, when recycled for reuse, causes desulfurization again. Based on the effective Ca of the unreacted substance present in the waste, the desulfurization efficiency achieved at Ca/S = 3 is about 67%. When the waste desulfurizing agent is recycled at an increased rate, a still higher desulfurization efficiency can be achieved, which nevertheless is lower than the efficiency attained in the above case (1).
(3) The waste desulfurizing agent enclosing the unreacted substance can be activated by at least partly neutralizing the unreacted substance in the waste with an acid. When the waste agent thus treated is placed into the high-temperature region of the furnace, the decomposition reaction of the Ca salt in this region permits the waste enclosing the unreacted substance to achieve a desulfurization efficiency of above 90% at Ca/S = 3 by the absorption of $SO_2$.
(4) When ammonia is supplied to the furnace after the neutralization treatment (3), denitration occurs simultaneously with desulfurization within the furnace. For example, when ammonia is used at a at a rate of 3 in $NH_3$ (mole)/NO (mole), the denitration efficiency attained is 70%. In this case, if the furnace is adapted for combustion with inhibited NOx to produce an exhaust gas which has a decreased NOx concentration of about 200 ppm and to which the present process of the invention is applied, the NOx concentration can be reduced to 60 ppm.

The dry simultaneous desulfurization-denitration process, i.e., the fourth process, achieves a high desulfurization efficiency of at least 90% at a low Ca/S equivalent ratio, i.e., with consumption of a reduced amount of fresh desulfurizing agent, and further attains a high denitration efficiency of at least 70% within the furnace at the same time.

EXAMPLES

Example 1

This example corresponds to the first process of the invention.

$CaCO_3$ serving as a desulfurizing agent and up 3 μ in particle size was neutralized with acetic acid in an amount of 10% based on weight. The treated agent was checked for $SO_2$ absorption efficiency. The result is represented by Curve C in FIG. 1.

Figure 1:
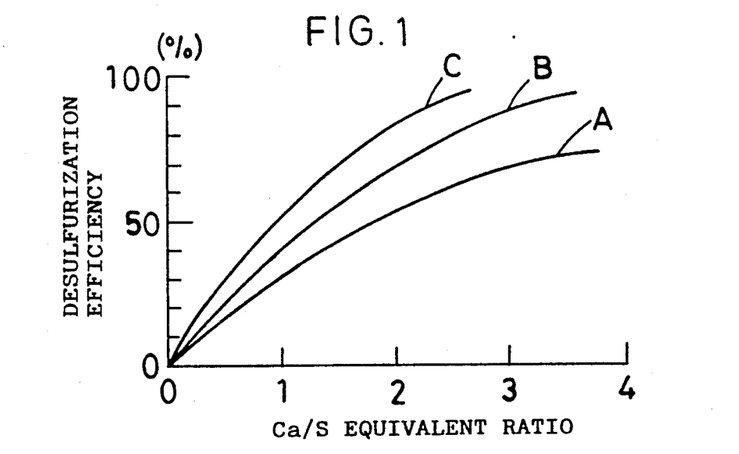
FIG. 1 is a graph showing the relationship between the Ca/S equivalent ratio and the desulfurization efficiency.

A comparison of the three curves in the graph shows that the $CaCO_3$ was considerably improved in desulfurization efficiency by the treatment. For example, the pretreatment with acetic acid apparently produces the following effect at Ca/S = 2.

| Curve | Desulfurizing agent | Efficiency |
|---|---|---|
| (A) | Particles of 12μ | 55% |
| (B) | Particles of up to 3μ | 70% |
| (C) | Particles of up to 3μ as treated | 80% |

We consider the effect to be attributable to the following.

Reaction between $CaCO_3$ and acetic acid:

$$CaCO_3 + 2CH_3COOH \rightarrow Ca(CH_3COO)_2 + CO_2 + H_2O \quad (4)$$

Thermal decomposition of product:

$$Ca(CH_3COO)_2 + H_2O \rightarrow CaO + 2CH_3COOH \quad (5)$$

The thermal decomposition of calcium acetate according to the reaction formula (5) produces CaO, which is greater in specific surface area than the CaO resulting from the thermal decomposition of $CaCO_3$, hence a higher desulfurization efficiency.

Such an effect is available also when an inorganic acid is used in place of the organic acid. For example, hydrogen chloride, when used, achieves a remarkable improvement in denitration efficiency like acetic acid.

However, when hydrogen chloride is used as the inorganic acid, decomposition of the neutralization product releases HCl, which gives rise to corrosion of devices.

$$CaCl_2 + H_2O \rightarrow CaO + 2HCl \uparrow \quad (6)$$

On the other hand, when an organic acid, e.g., acetic acid, is used, decomposition of the neutralization product produces $CH_3COOH$, which undergoes a combustion reaction in a high-temperature atmosphere in the presence of oxygen and becomes decomposed into harmless water and carbon dioxide. Accordingly, the organic acid is desirable to use.

$$CH_3COOH + 2O_2 \rightarrow 2CO_2 + 2H_2O \quad (7)$$

Example 2

This example corresponds to the second process.

(1) Efficient dispersion of desulfurizing agent of reduced particle size $CaCO_3$ serving as a desulfurizing agent and up to 3 μ in particle size was uniformly dispersed into a furnace to conduct a desulfurization reaction at an optimum temperature selected. The desulfurization efficiency achieved was exceedingly higher than is attained by the conventional process wherein larger particles are used. We conducted furnace desulfurization tests by firing pulverized coal at a rate of 10 kg/hour in a test furnace having a capacity of 0.38 m3 (hereinafter referred to as a "small test furnace"), with the results given below.

Figure 2:
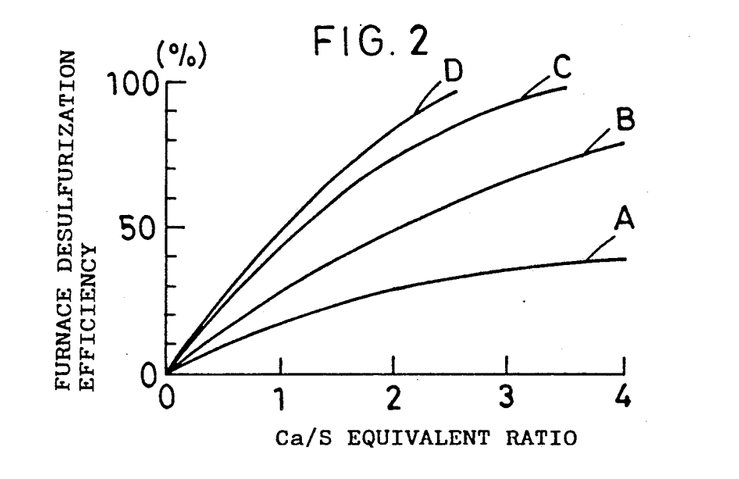
FIG. 2 is a graph showing the relationship between the Ca/S equivalent ratio and the furnace desulfurization efficiency.

Finely divided $CaCO_3$ was charged into the test apparatus as uniformly dispersed and tested for desulfurization. FIG. 2, Curve C represents the result for illustrative purposes. Curve C indicates that a desulfurization efficiency of 70% can be achieved at Ca/S=2, and a desulfurization efficiency of 90% at Ca/S=3. The desulfurization efficiency is much higher than the aforementioned FPA data, presumably because the causes (d) and (e) mentioned in "DESCRIPTION OF THE PRIOR ART" have been obviated.

(2) Recycling of waste desulfurizing agent enclosing unreacted substance

Figure 3:
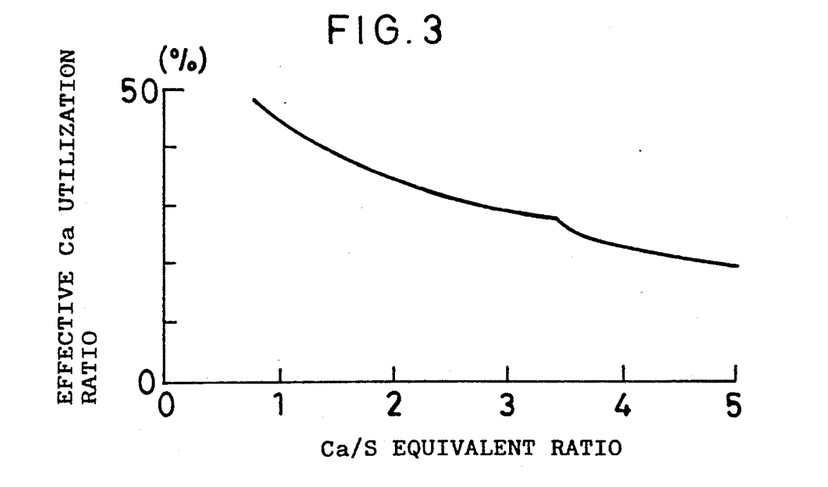
FIG. 3 is a graph showing the relationship between the Ca/S equivalent ratio and the effective Ca utilization ratio.

FIG. 3 shows calculated ratios of effective utilization of the Ca in the chemical agent used for the desulfurization test represented by Curve C of FIG. 2. (The inflection point between 3 and 4 in Ca/S means that the desulfurization efficiency will not exceed 100% even if the Ca/S ratio is made higher than the ratios in this region.) FIG. 3 reveals that for example, the desulfurization efficiency of 70% at Ca/S=2 effectively utilizes 35% of the Ca and that the first-stage desulfurization, when effected alone, permits 65% of the effective Ca component of the waste desulurizing agent enclosing the unreacted substance to be discharged and discarded along with the ash.

According to the present invention, the waste desulfurizing agent is recycled for reuse.

The waste desulfurizing agent having the unreacted substance enclosed therein was charged into the small test furnace and tested for desulfurization efficiency. In this test, the waste was placed into the region with a temperature of 1200° C. within the furnace. FIG. 2, Curve A represents the test result. Table 1 given later shows the composition of the waste agent tested. The ash containing the waste was prepared from the ash resulting from the above test conducted at Ca/S=3 for continuous desulfurization, by removing a portion of ash with a pneumatic classifier. Accordingly, the ash content is lower than the ash content of usual waste desulfurizing agent.

The effective CaO content given in Table 1 is 34.5 wt. %. The desulfurization efficiency represented by FIG. 2, Curve A was as low as 40% at Ca/S=4. When the same ash containing the waste was charged into the test furnace in the region thereof having a temperature of up to 1000° C., the desulfurization efficiency represented by FIG. 2, Curve B was achieved. The ash thus charged in improved the efficiency to 75% at Ca/S =4. The difference between Curves A and B is due to the difference in the temperature of atmosphere between the different positions where the ash was supplied. Differential thermal analysis revealed that under the conditions of Curve A, $CaSO_4$ was decomposed to release $SO_2$. The result indicates that it is possible to obtain a high desulfurization efficiency even with use of the waste desulfurizing agent having the unreacted substance enclosed therein, if the waste is charged into the region of optimum temperature in a large quantity.

Nevertheless, the waste is apparently inferior to the fresh desulfurizing agent in properties, and the impaired properties are attributable to the cause (a) already mentioned.

(3) Activation of waste desulfurizing agent

Figures 4, 5:
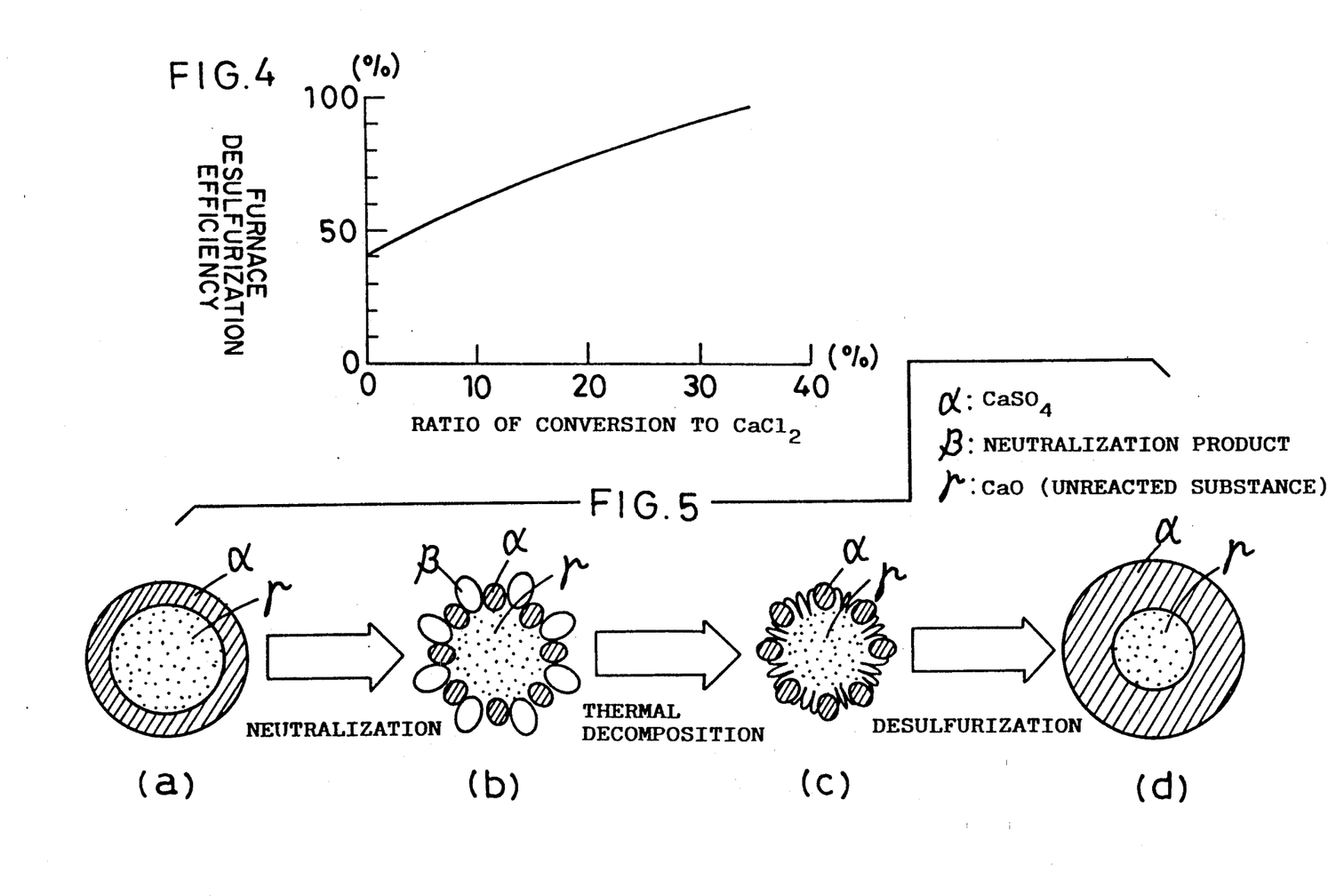
FIG. 4 is a graph showing the relationship between the $CaCl_2$ conversion ratio and the furnace desulfurization efficiency.

If the waste desulfurizing agent enclosing the unreacted substance is recycled in a large quantity for the second-stage desulfurization, a large amount of ash is recycled through the system, giving rise to problems such as clogging or wear of the piping or ducts with particles, necessity to use a dust collector of increased capacity, and an increased running cost for transport. The amount to be recycled is therefore preferably a minimum required. In an attempt to decrease the amount of recycle, addition of an acid gas was tested for the activation of the waste desulfurizing agent using the small test furnace. More specifically, an ash containing the waste agent enclosing the unreacted substance was treated with a predetermined proportion of HCl gas, then charged into the region having a temperature of up to 1000° C. at Ca/S=1.3 and checked for desulfurization efficiency. FIG. 4 shows the result, which reveals a remarkable improvement over the efficiency represented by FIG. 2, Curve B. The reason will be as follows. The unreacted substance, CaO, in the waste agent is neutralized with the HCl added. In this case, it is seen that the greater the ratio of conversion to $CaCl_2$, the higher is the desulfurization efficiency. The efficiency shown in FIG. 4 was achieved at a fixed Ca/S equivalent ratio of 1.3. The waste-containing ash tested had the composition shown in Table 1.

FIG. 1 indicates that when the ratio of conversion to $CaCl_2$ is, for example, 30%, a desulfurization efficiency of about 90% can be achieved even at the low Ca/S equivalent ratio of 1.3. Presumably, this is because the neutralization reaction breaks down the $CaSO_4$ layer mentioned in the foregoing cause (a) to form an activated surface of CaO and result in an accelerated desulfurization reaction.

It is thought that this process involves the following sequence of reactions. (However, it is likely that the reactions (IV) and (V) occur concurrently.)

(III) Reaction of $CaSO_4$-covered CaO with HCl (at room temperature):

$$CaO + 2HCl \rightarrow CaCl_2 + H_2O \quad (8)$$

(IV) Decomposition of $CaCl_2$ in high-temperature region:

$$CaCl_2 + H_2O \rightarrow CaO + 2HCl \quad (9)$$

(V) Absorption of $SO_2$ by CaO having active surface in high-temperature region:

$$CaO + SO_2 + \tfrac{1}{2}O_2 \rightarrow CaSO_4 \quad (10)$$

Alternatively, the reactions (IV) and (V) may proceed as follows:

$$CaCl_2 + SO_2 + \tfrac{1}{2}O_2 + H_2O \rightarrow CaSO_4 + 2HCl$$

(VI) Second reaction between CaO and HCl in low-temperature region:

$$CaO + 2HCl \rightarrow CaCl_2 \quad (11)$$

For a better understanding of the sequence of reactions, FIG. 5 schematically shows the particle of desulfurizing agent. (The secondary reaction product in this case is $CaCl_2$.)

When thermal decomposition occurs in the above process according to the formula (9) in the high-temperature region as seen in FIG. 5, (c), the release of HCl will form pores in the surface of the CaO particle, consequently giving an increased surface area to activate the particle. (Alternatively, the thermal decomposition is considered to break down the CaO particle into smaller particles to result in an increased surface area.)

Desulfurization was effected at varying Ca/S equivalent ratios for waste desulfurizing agent, in which the ratio of conversion of the unreacted substance CaO to $CaCl_2$ a predetermined value of 10%. FIG. 2, Curve D represents the desulfurization efficiency then achieved.

This curve indicates that the addition of HCl fully activated the waste to attain a higher efficiency than Curve A representing fresh desulfurizing agent.

Next, the use of acetic acid as the neutralization activating agent will be described. In the case of acetic acid, the following reaction takes place.

$$CaO + 2CH_3COOH \rightarrow Ca(CH_3COO)_2 + H_2O \quad (12)$$

The resulting calcium acetate thermally decomposes as follows.

$$Ca(CH_3COO)_2 + H_2O \rightarrow CaO + 2CH_3COOH \quad (13)$$

The activation and $SO_2$ absorption steps are exactly the same as in the case of HCl. However, acetic acid, which is an organic substance, burns on contact with oxygen in the high-temperature region.

$$CH_3COOH + 2O_2 \rightarrow 2CO_2 + 2H_2O \quad (14)$$

Thus, unlike the inorganic neutralizing agent, the organic neutralizing agent is converted to $CO_2$ and $H_2O$ on burning and has the advantage of being in no way likely to cause corrosion to devices like HCl or to release waste HCl with an unreacted substance enclosed therein.

Further in the case of acetic acid, the relationship between the ratio of conversion to $Ca(CH_3COO)_2$ and the desulfurization efficiency is approximate to that shown in FIG. 4; it has been found that acetic acid acts effectively as an activating agent to achieve a desulfurization efficiency which increases with an increase in the conversion ratio.

$Cl_2$ gas, $Br_2$ gas or like gas, when used in place of HCl gas, achieves exactly the same result. Especially, $Br_2$ gas also produces a denitration effect within the furnace and is therefore a favorable substance.

As described above, inorganic acids, inorganic acid gases, organic acids and organic acid gases have proved effective for activating the waste desulfurizing agent. It has also been found that the combination of the activating method with the usual desulfurization process greatly reduces the amount of fresh desulfurizing agent to be supplied and achieves a high desulfurization efficiency of at least 90% at the supply Ca to S equivalent ratio of 2.

TABLE 1

| Composition of Ash Containing Waste Desulfurizing agent | |
|---|---|
| Component | Proportion (wt. %) |
| $CaSO_4$ | 28.56 |
| CaO | 32.56 |
| $CaCO_3$ | 3.60 |
| Ash | 35.28 |

Comparative Examples 1 and 2, and Example 3 given below are concerned with the third process of the invention.

Comparative Example 1

Figure 8:
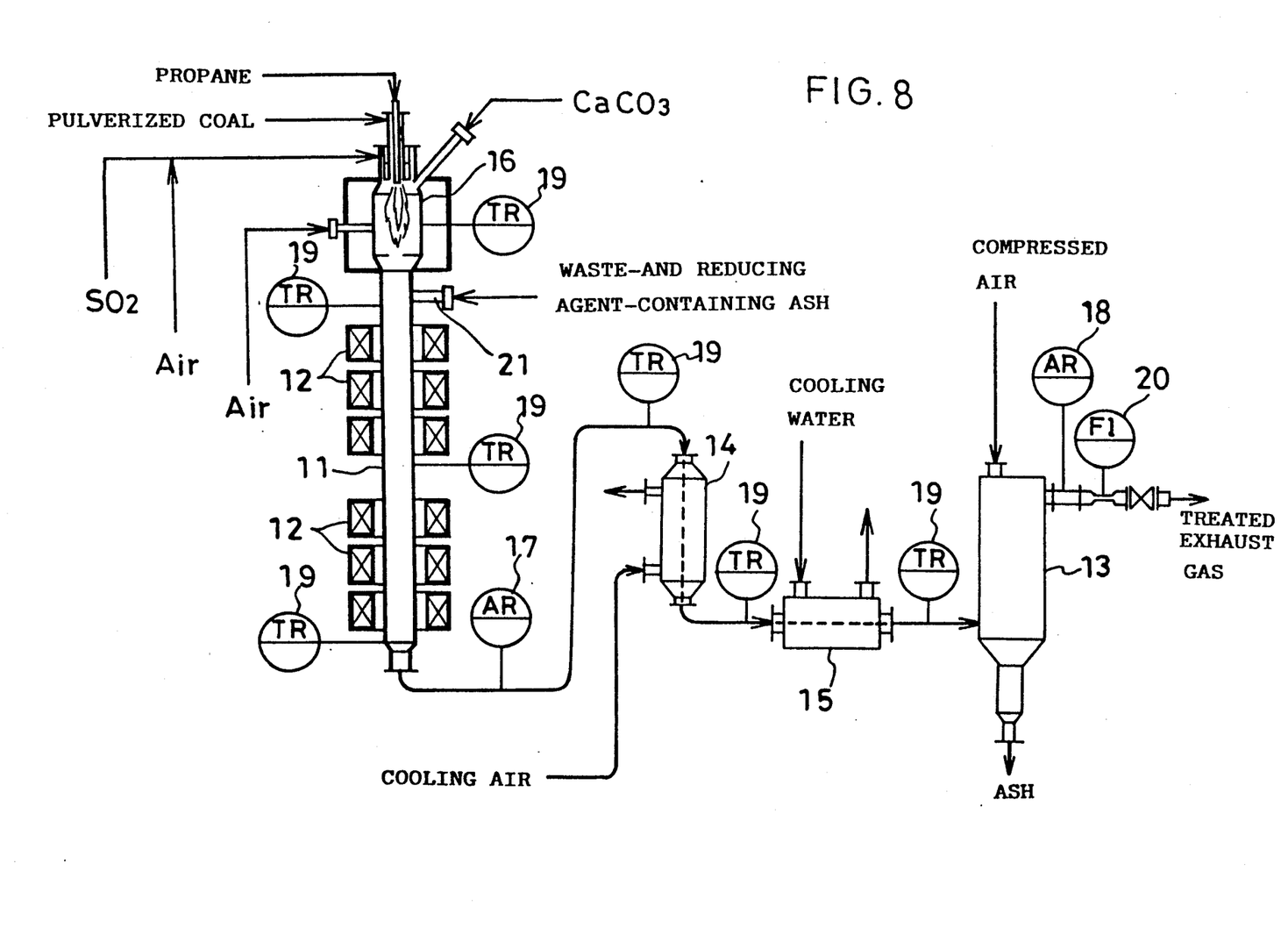

In this comparative example, the lime blowing method of the prior art was checked for desulfurization efficiency and denitration efficiency to clarify the feature of Example 3 given below. FIG. 8 is a flow chart showing the test method used in the present comparative example and Example 3. The system used for testing consists primarily of a combustion chamber 16 for firing pulverized coal, and a reaction chamber 11 disposed downstream from the chamber 16 for desulfurization and denitration. The combustion capacity is 10 kg/hour. With this system, the combustion temperature and the amount of NOx to be produced are controllable by burning propane as an auxiliary fuel, and the $SO_2$ concentration of the exhaust gas is adjustable by injecting $SO_2$ gas. The reaction chamber 11 is provided by a stainless steel tube, 330 mm in inside diameter and 4 m in height, and is controllable to a specified temperature by electric heaters 12 disposed around the tube. $CaCO_3$ serving as a desulfurizing agent is injected into the combustion chamber 16. The ash containing waste desulfurizing agent and reducing agent and to be used in Example 3 is injected, as entrained in an air stream, into the reaction chamber 11 through an inlet 21 at the top thereof. The $O_2$, $SO_2$ and NOx concentrations of the exhaust gas are measured by analyzers 17 and 18 disposed at the outlet of the reaction chamber 11 and the outlet of a bag filter 13, respectively. The exhaust gas is cooled by an air heater 14 and a gas cooler 15, separated from dust by the bag filter 13 and released to the atmosphere. The diagram further shows thermometers 19 and a flowmeter 20.

Finely divided $CaCO_3$ (3 μ in mean particle size) serving as a desulfurizing agent was charged into the combustion chamber of the system. The main conditions involved were given below. The system achieved a desulfurization efficiency of 62% with a denitration efficiency of 0%.

Fuel: propane-pulverized coal mixture (propane: 0.64 $Nm^3$/hour, coal: 3.24 kg/hour)

Air ratio: 1.81 (oxygen concentration of exhaust gas: 9.4%).

Rate of discharge of exhaust gas: 70 Nm3/hour

NOx concentration: 260 ppm, $SO_2$ concentration: 900 ppm (as adjusted by addition of pure $SO_2$), Reaction time: 4 seconds, Temperature: 1200 to 1300° C. in combustion chamber, 1100° C. in reaction chamber, Ca/S: 2.1.

The above-mentioned desulfurization efficiency of 62% was achieved using finely divided $CaCO_3$ at a high reaction temperature. When the system was operated under exactly the same reaction conditions as above with the exception of reducing the reaction temperature from 1100° C. to 780° C., the desulfurization efficiency attained was 15%.

Comparative Example 2

The system of FIG. 8 was operated under the same conditions as in Comparative Example 1 with the exception of charging no desulfurizing agent into the combustion chamber 16 and placing ash of the composition given in Example 2, Table 1 into the reaction chamber 11.

The ash was prepared from the ash collected by the bag filter 13, by concentrating the waste desulfurising agent in the ash with use of a pneumatic classifier. The ash was used in such an amount that the ratio of Ca from CaO and $CaCO_3$ to S, i.e., Ca/S, was 2.1. At a reaction temperature of 780° C., the desulfurization efficiency achieved was 10 to 15%, and the denitration efficiency 0%.

Example 3

With the same ash containing the waste desulfurizing agent as used in Comparative Example 2 was admixed urea in the ratio by weight of 4:1 or 9:1 to prepare mixtures (a) and (b) which were each an ash containing the waste and the urea serving as a reducing agent. The system of FIG. 8 was operated under the same conditions as in Comparative Example 1 with the exception of varying the amount of the mixture to be charged into the reaction chamber 11. Table below shows the desulfurization efficiencies and the denitration efficiencies attained.

| | 4:1 Mixture (a) | | 9:1 Mixture (b) | |
| --- | --- | --- | --- | --- |
| Ca/S ratio | Desulfurization (%) | Denitration (%) | Desulfurization (%) | Denitration (%) |
| 0.9 | 39 | 50 | 30 | 47 |
| 1.1 | 53 | 71 | 33 | 61 |
| 1.3 | 60 | 79 | 36 | 78 |
| 2.0 | 90 | 97 | 60 | 98 |

In the present example, the ash discharged from the bag filter was checked for ammonium ion, but no ammonium ion was detected Example 4

This example corresponds to the fourth process of the invention.

In the tests and application example described below, the test apparatus used was a furnace having a capacity of about 0.38 $m^3$ and adapted to burn pulverized coal at a rate of up to 10 kg/hour. The pulverized coal used was Tatung coal not larger than 200 mesh in particle size. The $SO_2$ concentration of the exhaust gas was adjusted to 800 ppm by addition of liquefied $SO_2$. The internal temperature of the furnace was maintained at an optimum level by controlling the amount of heat to be dissipated. For the denitration test, the supply of the pulverized coal was regulated, and the temperature was adjusted to an optimum temperature for denitration. The NOx then produced was 190 to 210 ppm.

The desulfurizing agent tested was finely divided $CaCO_3$ up to 3 μ in particle size. The waste desulurizing agent having an unreacted substance enclosed therein was activated with hydrogen chloride gas, acetic acid, chlorine gas, bromine gas or the like. The denitrating agent used was liquefied ammonia or urea powder. During testing, the exhaust gas was produced at a total rate of 100 to 120 $Nm^3$/hour. The desulfurizing agent and the waste thereof enclosing the unreacted substance were dispersed into the furnace by an air spray method.

Test 1

Figure 9:
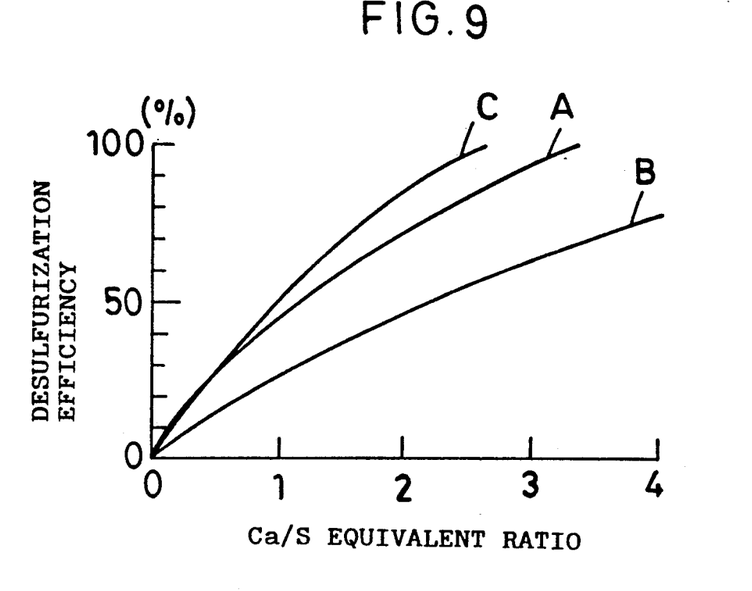
FIG. 9 is a graph showing the relationship between the Ca/S equivalent ratio and the desulfurization efficiency.

The amount of $CaCO_3$ increased stepwise from 1 to 3 in terms of Ca/S ratio and checked for $SO_2$ absorbing ability. In this test, the improving methods i) to iii) mentioned in "DESCRIPTION OF THE PREFERRED EMBODIMENTS" were investigated. FIG. 9, Curve A represents an example of test result The desulfurization efficiency attained was 90% at Ca/S=3 and exceedingly higher than that in the EPA report, thus substantiating the great feasibility of the furnace desulfurization process.

Test 2

The waste desulfurizing agent was checked for desulfurization efficiency. $CaSO_4$ was removed from the waste agent having the unreacted substance enclosed therein. The amount of the resulting waste agent was increased stepwise from 1 to 4 in Ca/S ratio based on effective Ca and checked for $SO_2$ absorbing ability. FIG. 9, Curve B represents the result. The desulurization efficiency achieved was 68% at Ca/S=3. The result reveals that although the waste desulfurizing agent enclosing the unreacted substance is less efficient than the fresh one, the waste attains a higher desulfurization efficiency when used in an increased amount.

Test 3

Each of hydrogen chloride gas, acetic acid vapor, chlorine gas, bromine gas, etc. was singly used for treating the same waste desulfurizing agent enclosing the unreacted substance as used in Test 3, and the resulting wastes were checked for desulfurization efficiency. Consequently, it was found that the efficiency varied greatly according to the degree of neutralization of the unreacted substance CaO (inclusive of $CaCO_3$) in the waste with the acid. As an example, FIG. 9, Curve C shows the relationship between Ca/S and the desulfurization efficiency achieved by the waste containing 10% neutralization product based on the amount of effective Ca and treated with hydrogen chloride gas. Curve C reveals a desulfurization efficiency of at least 90% at Ca/S=3, indicating that the waste agent containing the unreacted substance and treated with the acid was activated by the neutralization to effect desulfurization more efficiently than the fresh agent.

Test 4

The waste desulfurizing agent activated with hydrogen chloride gas in Test 3 was further treated with ammonia gas.

Figure 10:
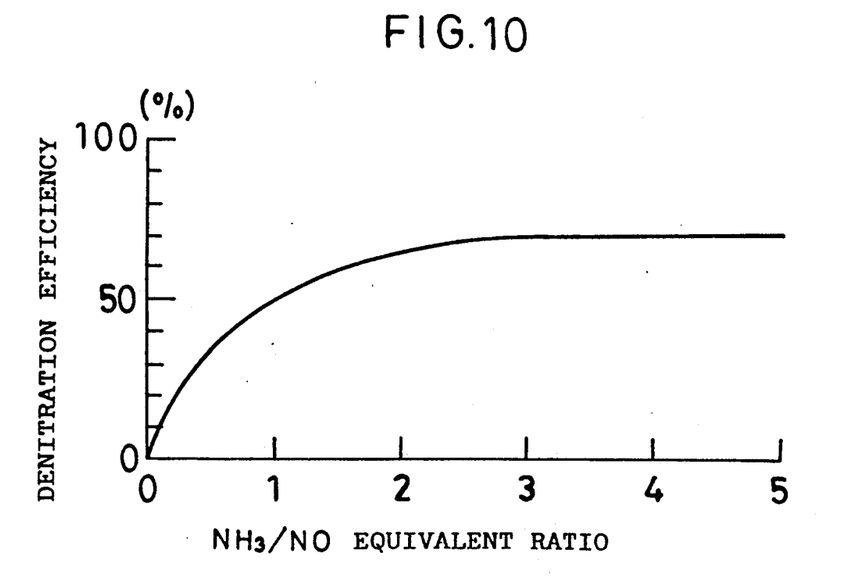
FIG. 10 is a graph showing the relationship between the $NH_3/NO$ equivalent ratio and the denitration efficiency.

In this test, the supply of pulverized coal was limited, and the temperature at the position where the unreacted substance enclosing waste agent was injected was adjusted to 900° C. The quantity of NOx produced at this time was 200 ppm. The amount of ammonia used was increased stepwise from 1 to 5 in terms of $NH_3/NO$ ratio, and the waste was checked for denitration efficiency. The result is shown in FIG. 10, which indicates that a constant NOx removal efficiency of 70% was attained at the $NH_3/NO$ ratio of 3 or higher.

A powder of urea, when to be used, was supplied in such an amount that the $NH_3/NO$ ratio was about twice the corresponding value for ammonia. The denitration efficiency then achieved was comparable to that attained by ammonia. Thus, urea was somewhat less effective than ammonia. However, use of urea resulted in a higher $SO_2$ removable efficiency and was therefore effective also for desulfurization.

Application Example

In view of the foregoing test results, the present process was practiced in a boiler test plant wherein pulverized coal was supplied at a rate of 1800 kg/hour (dry base).

Figure 11:
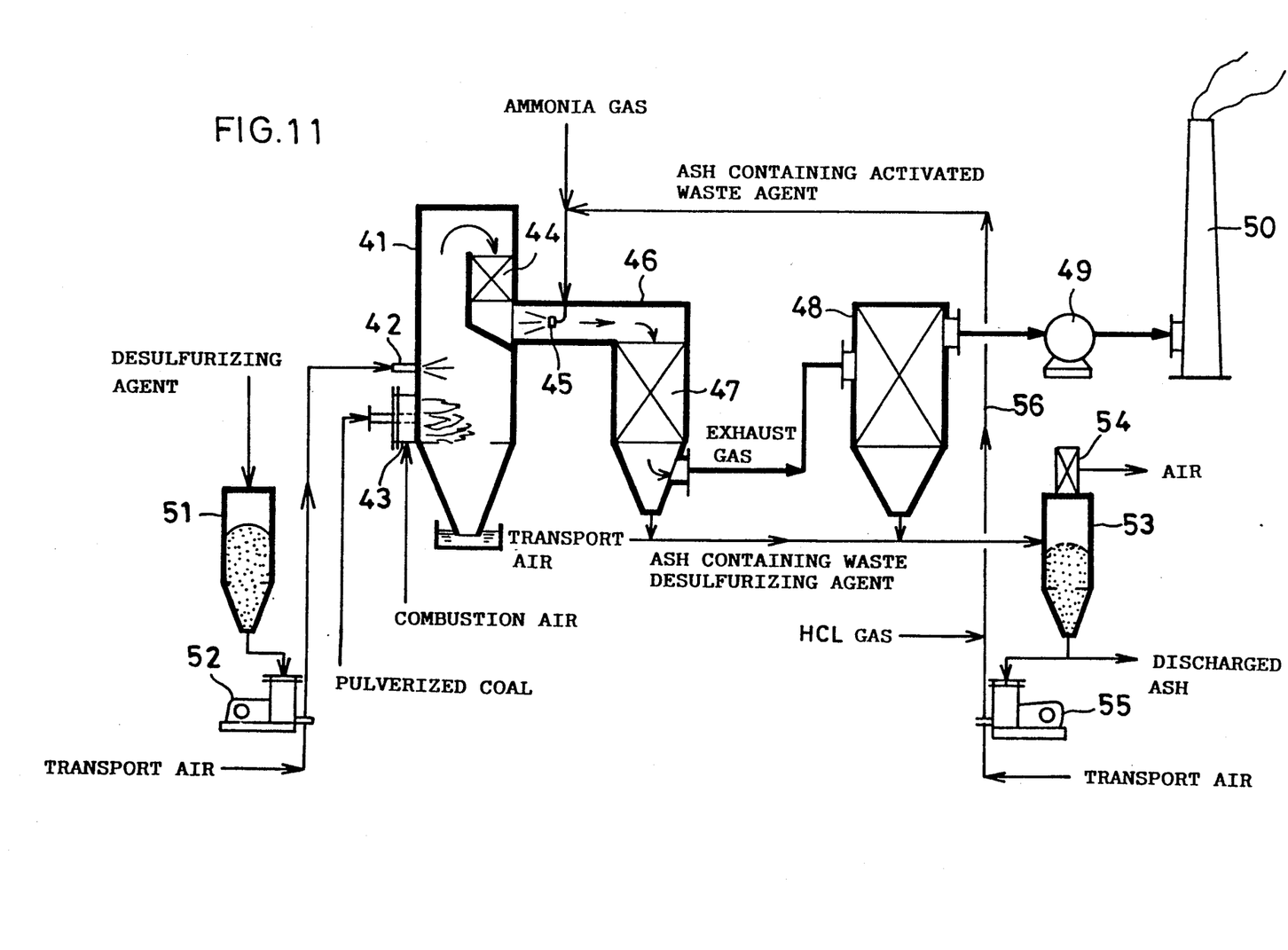
FIG. 11 is a flow chart showing an embodiment of the invention.

FIG. 11 shows the process flow according to the invention. With reference to the flow chart, pulverized coal is burned by a low-NOx combustion device 43 for a test boiler 41. The furnace of the boiler 41 has a temperature of 900 to 1200° C. A desulfurizing agent in a tank 51 is sent out to a supply line by a feeder 52 and pneumatically transported to a nozzle 42, from which the agent is sprayed into the furnace. A desulfurization reaction takes place in the furnace, reducing the $SO_2$ concentration of the exhaust gas in corresponding relation to the amount of supply of Ca. However, the effective Ca utilization ratio inside the furnace is lower than 35%. The waste desulfurizing agent enclosing the unreacted substance and the ash of the pulverized coal become mixed together, pass through a heater 44 and then through an air heater 47, and reach a dust collector 48, in which the ash containing the unreacted substance-enclosing waste is trapped. The exhaust gas flows through a suction fan 49 and then through a stack 50 and is discharged from the system. The collected ash is pneumatically transported from the dust collector 48 to an ash tank 53, in which it is accumulated. The air used for the transport is discharged from the system via a bag filter 54. The ash containing the unreacted substance-enclosing waste is partly discharged from the tank 53, pneumatically transported by a feeder 55 through a recycle line 56 to a nozzle 55, by which the ash is sprayed into a flue 46. Hydrogen chloride gas is supplied to the recycle line 56 to partly neutralize the waste desulfurizing agent having the unreacted substance enclosed therein The neutralized waste agent undergoes a complete activation reaction within the recycle line 56. Ammonia is introduced into the recycle line 56 in the vicinity of the ash spray nozzle 45. The ash thus obtained and containing the neutralized salt and the reducing agent undergoes a desulfurization reaction again at a temperature of 500 to 1000° C. in the flue 46 to the upper portion of the air heater 47 and also undergoes a denitration reaction at the same time. In this way, desulfurization and denitration are effected simultaneously. Typical conditions for the present process are given below.

| Item | Value | Unit | Remarks |
|---|---|---|---|
| a) Combustion of Coal | | | |
| Kind | Tatung coal | — | |
| Rate of combustion of pulverized coal | 1800 | kg/h | dry base (9.3% ash) |
| $SO_2$ concn. | 800 | ppm | adjusted with liquefied $SO_2$ |
| NOx concn. | 200 | ppm | after NOx-inhibited combustion |
| Rate of discharge of exhaust gas | about 17000 | $Nm^3/h$ | dry base |
| b) Desulfurizing Agent | | | |
| Kind | $CaCO_3$ | — | Up to 3μ in mean particle size |
| Supply rate | 122 | kg/h | |
| Ca/S equivalent ratio | 2.0 | — | |
| c) Ash Containing Waste Desulfurizing Agent | | | |
| Rate of recycle | 1 to 1.5 times the ash discharge rate | | |
| d) Hydrogen Chloride Gas | | | |
| Kind | HCl | — | for industrial use |
| Rate of supply | 4.8 | kg/h | |
| Ratio of conversion to $CaCl_2$ | 10 | % | |
| e) Ammonia | | | |
| Kind | Ammonia gas | — | for industrial use |
| Rate of supply | 7.7 | kg/h | |
| f) Composition of Exhaust Gas | | | |
| $SO_2$ | 50–80 | ppm | |
| NOx | 50–60 | ppm | |
| HCl | up to 18 | ppm | |
| g) Discharged Ash | | | |

-continued

| Item | Value | Unit | Remarks |
|---|---|---|---|
| Rate of discharge | 283 | kg/h | dry base |
| Composition | | | |
| CaSO$_4$ | 26.3 | | |
| CaO | 11.9 | wt. % | effective Ca utilization ratio 45% |
| CaCl$_2$ | 2.5 | | |
| Ash | 59.3 | | |

What is claimed is:

1. A dry simultaneous desulfurization-denitration process comprising supplying a Ca desulfurizing agent into a furnace or flue to effect a desulfurization reaction, collecting ash containing a waste of the agent having an unreacted substance enclosed therein from the exhaust gas, adding a denitrating reducing agent to the collected ash, and recycling the ash containing the waste desulfurizing agent and the reducing agent into the furnace or flue to effect desulfurization and denitration reactions.

2. A process as defined in claim 1 wherein the Ca desulfurizing agent is supplied into the furnace or flue along with the ash containing the waste desulfurizing agent and the reducing agent.

3. A process as defined in claim 1 or 2 wherein ammonia, ammonium salts, urea and urea derivatives are used singly or in combination in the form of a powder or solution as the denitrating educing agent.

4. A process as defined in claim 1 or 2 wherein the ash containing he waste desulfurizing agent and the reducing agent is blown in the form of a powder or slurry into a region of the furnace or flue, said region having a temperature of 500 to 1000° C.

5. The process of claim 3, wherein said ammonium salts is at least one member from the group consisting of ammonium carbonate, ammonium formate and ammonium oxalate.

6. A dry simultaneous desulfurization-denitration process comprising supplying a Ca desulfurizing agent into a furnace or flue to effect a desulfurization reaction, collecting ash containing a waste of the agent having an unreacted substance enclosed therein from the exhaust gas, adding an acid to the collected ash to at least patly neutralize the unreacted substance, adding a denitrating reducing agent to the ash containing the resulting salt, and recycling the ash containing the salt and the reducing agent into the furnace of flue to effect desulfuization and denitration reactions.

7. A process as defined in claim 6 wherein the ash containing the salt and the reducing agent is blow in the form of a powder or slurry into a region of the furnace or flue, said region having a temperature of 500 to 1000° C.

8. A process as defined in claim 6 or 7 wherein said denitrating agent is at least one member selected from the group consisting of ammonia, ammonium salts, urea and urea derivatives, and said denitrating agent is in the form of a powder or solution.

9. A process as defined in claim 6 or 7 wherein said acid is at least one inorganic acid or at least one organic acid.

10. The process of claim 8 wherein said ammonium salt is selected from the group consisting of ammonium carbonate, ammonium formate and ammonium oxalate.

11. The process of claim 9 wherein said inorganic acid is selected from the group consisting of hydrochloric acid, nitric acid hydrogen chloride, chlorine, bromine, fluorine and iodine.

12. The process of claim 9, wherein said organic acid is selected from the group consisting of acetic acid, oxalic acid and formic acid.

* * * * *